United States Patent
Dong et al.

(10) Patent No.: US 11,055,360 B2
(45) Date of Patent: Jul. 6, 2021

(54) DATA WRITE-IN METHOD AND APPARATUS IN A DISTRIBUTED FILE SYSTEM

(71) Applicant: ALIBABA GROUP HOLDING LIMITED, Grand Cayman (KY)

(72) Inventors: Chengyu Dong, Hangzhou (CN); Jiaji Zhu, Hangzhou (CN); Haiyong Zhang, Hangzhou (CN); Feng Cao, Hangzhou (CN); Yong Wang, Hangzhou (CN); Wenhui Yao, Hangzhou (CN); Junping Wu, Hangzhou (CN); Yang Wu, Hangzhou (CN); Yuanyuan Dong, Hangzhou (CN); Dongzheng Wu, Hangzhou (CN); Jing Lu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 365 days.

(21) Appl. No.: 15/970,820

(22) Filed: May 3, 2018

(65) Prior Publication Data
US 2018/0253506 A1      Sep. 6, 2018

Related U.S. Application Data

(63) Continuation of application No. PCT/CN2016/103139, filed on Oct. 25, 2016.

(30) Foreign Application Priority Data

Nov. 3, 2015 (CN) .......................... 201510740419.5

(51) Int. Cl.
*G06F 16/907* (2019.01)
*G06F 16/182* (2019.01)
(Continued)

(52) U.S. Cl.
CPC .......... *G06F 16/907* (2019.01); *G06F 3/0611* (2013.01); *G06F 9/5016* (2013.01);
(Continued)

(58) Field of Classification Search
CPC ............... G06F 3/0619; G06F 11/1076; G06F 11/2094; G06F 3/067; G06F 3/0689;
(Continued)

(56) References Cited

U.S. PATENT DOCUMENTS 6,317,808 B1    11/2001   Berenshteyn
2004/0064577 A1*  4/2004  Dahlin ................ H04L 69/329
                                                        709/235
(Continued)

FOREIGN PATENT DOCUMENTS

| CN | 101470733 A | 7/2009 |
| CN | 102375893 A | 3/2012 |

(Continued)

OTHER PUBLICATIONS

First Search Report issued in corresponding International Application No. 201510740419.5 (1 pg.).
(Continued)

*Primary Examiner* — Angelica Ruiz
(74) *Attorney, Agent, or Firm* — Finnegan, Henderson, Farabow, Garrett & Dunner, LLP

(57) ABSTRACT

Embodiments of the disclosure provide a data write-in method and apparatus. The data write-in method includes: selecting a target replica server from a plurality of replica servers managed by a metadata server according to remaining capacity of the plurality of replica servers; selecting a write-in disk in the target replica server according to remaining capacity and load of disks managed by the target replica server; and storing write-in data into the write-in disk through the target replica server.

17 Claims, 10 Drawing Sheets

```
Determining a probability of a disk being selected
according to the remaining capacity and the load of   ~201
the disks managed by the target replica server
                        │
                        ▼
Determining the write-in disk according to the
probabilities of the disk and a preset condition       ~202
```

(51) Int. Cl.
  *G06F 16/00* (2019.01)
  *G06F 3/06* (2006.01)
  *G06F 9/50* (2006.01)
  *G06F 17/18* (2006.01)

(52) U.S. Cl.
  CPC ............ *G06F 16/00* (2019.01); *G06F 16/182* (2019.01); *G06F 16/1844* (2019.01); *G06F 17/18* (2013.01)

(58) Field of Classification Search
  CPC ......... G06F 11/1662; G06F 2211/1028; G06F 11/2023; G06F 3/065; G06F 11/1469; G06F 11/2058; G06F 16/27; G06F 3/0647; G06F 3/0653
  See application file for complete search history.

(56) References Cited

U.S. PATENT DOCUMENTS

| | | | | |
|---|---|---|---|---|
| 2007/0260611 | A1* | 11/2007 | Bohannon | G06F 16/958 |
| 2008/0126451 | A1* | 5/2008 | Sawdon | G06F 3/061 |
| 2010/0235409 | A1* | 9/2010 | Roy | G06F 16/1827 707/812 |
| 2012/0166487 | A1* | 6/2012 | Stougie | G06F 11/1076 707/792 |
| 2013/0132698 | A1* | 5/2013 | Huang | G06F 3/0611 711/170 |
| 2014/0297950 | A1* | 10/2014 | Kuwayama | G06F 3/0617 711/114 |
| 2015/0149423 | A1* | 5/2015 | Kiselev | G06F 11/2064 707/694 |
| 2015/0278397 | A1* | 10/2015 | Hendrickson | G06F 16/9024 707/798 |
| 2015/0280959 | A1* | 10/2015 | Vincent | H04L 67/1097 709/203 |

FOREIGN PATENT DOCUMENTS

| | | |
|---|---|---|
| CN | 102541460 A | 7/2012 |
| CN | 102629934 A | 8/2012 |
| CN | 103077197 A | 5/2013 |
| CN | 104023088 A | 9/2014 |
| WO | WO 2017/076184 A1 | 5/2017 |

OTHER PUBLICATIONS

First Office Action issued by The State Intellectual Property Office of People's Republic of China in corresponding Chinese Application No. 201510740419.5; dated Jul. 12, 2019 (15 pgs.).
Extended European Search Report pursuant to Rule 62 EPC, the Supplementary European Search Report (Art. 153(7) EPC) and the European Search Opinion issued in EPO Application No. 16861452.7 dated Aug. 3, 2018 (10 pages).
Fetterly et al., "TidyFS: A Simple and Small Distributed File System," Usenix.org, pp. 1-14 (2011).
PCT Search Report and Written Opinion issued in International Application No. PCT/CN2016/103139, dated Feb. 7, 2017 (14 pages).

* cited by examiner

DATA WRITE-IN METHOD AND APPARATUS IN A DISTRIBUTED FILE SYSTEM

CROSS REFERENCE TO RELATED APPLICATION

The disclosure claims the benefits of priority to International application number PCT/CN2016/103139, filed Oct. 25, 2016, and Chinese application number 201510740419.5, filed Nov. 3, 2015, both of which are incorporated herein by reference in their entireties.

BACKGROUND

In a large-scale online distributed storage system, a single server may contain a lot of disks, and each disk may be different. Moreover, there may also have a heterogeneous structure within a server. For example, a server may include two types of disks with different capacities. A distributed storage system may provide the heterogeneous structure of data storage, but how to select a disk to write data into it when the data arrives is a problem that needs to be considered.

A conventional distributed file system uses the consistency hash algorithm to select a disk. The method is a fixed disk selection strategy selecting a disk by doing hashing in advance according to data partition. The hash algorithm can provide balance and usually does not produce hot spots. However, when data is concentrated in the same data partition, the selected disk often fails to avoid the large amount of write-ins, thereby leading to the disk being fully written and to write-in failure. Meanwhile, the intensive traffic can produce hotspot access and extend the write-in time.

Therefore, a technical problem is: how to prevent a disk from being fully written and producing hotspot access.

SUMMARY OF THE DISCLOSURE

The object of embodiments of the disclosure is to provide a data write-in method, so as to prevent a disk from being fully written and producing hotspot access.

Embodiments of the disclosure provide a data write-in method. The method can include: selecting at least one target replica server from a plurality of replica servers managed by a metadata server according to remaining capacity of the plurality of replica servers; selecting a write-in disk in the target replica server according to remaining capacity and load of disks managed by the target replica server; and storing write-in data into the write-in disk through the target replica server.

Embodiments of the disclosure further provide a data write-in apparatus. The apparatus can include: a first selection unit configured to select at least one target replica server from a plurality of replica servers managed by a metadata server according to remaining capacity of the plurality of replica servers; a second selection unit configured to select a write-in disk in the target replica server according to remaining capacity and load of disks managed by the target replica server; and a storage unit configured to store write-in data into the write-in disk through the target replica server.

Embodiments of the disclosure also provide a non-transitory computer readable medium that stores a set of instructions that is executable by at least one processor of a computing system to cause the computing system to perform a data write-in method. The method can include selecting at least one target replica server from a plurality of replica servers managed by a metadata server according to remaining capacity of the plurality of replica servers; selecting a write-in disk in the target replica server according to remaining capacity and load of disks managed by the target replica server; and storing write-in data into the write-in disk through the target replica server

DETAILED DESCRIPTION

To make the above-mentioned objects, features and advantages of the disclosure more obvious and easier to understand, the disclosure is further described in detail below with reference to the accompanying drawings and the specific implementations.

Figure 1:
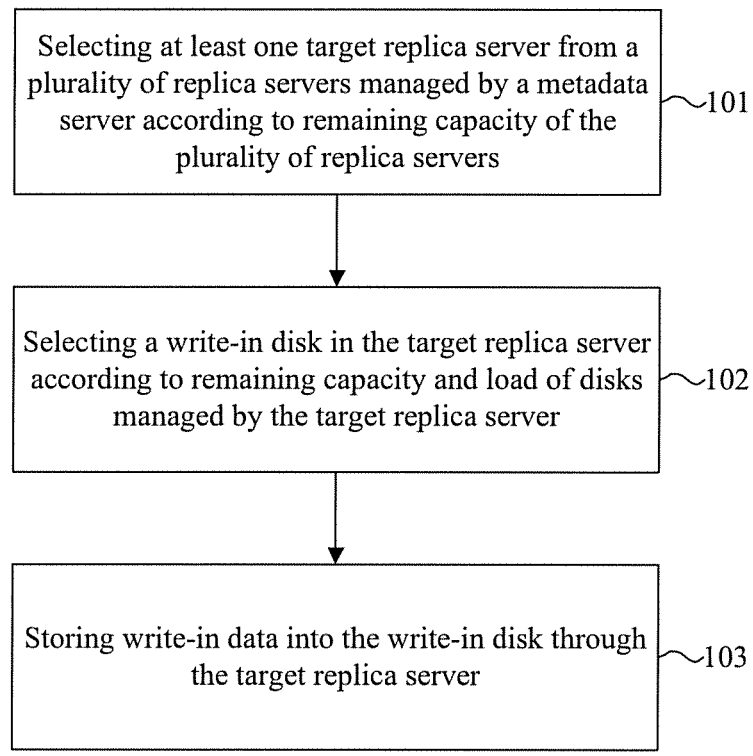
FIG. 1 is a flowchart of a data write-in method in a distributed file system of the disclosure, according to embodiments of the disclosure.

FIG. 1 is a flowchart of a data write-in method in a distributed file system, according to embodiments of the disclosure. The method can include the following steps 101-103.

In step 101, at least one target replica server can be selected from a plurality of replica servers managed by a metadata server according to remaining capacity of the plurality of replica servers.

In embodiments of the disclosure, a metadata server and replica servers are set in the distributed file system. The metadata server can manage replica information of name spaces and data blocks and address information of the replica servers. The replica servers can manage local replicas of the data blocks and provide read and write operations on the managed data block replicas.

A two-stage disk selection mechanism can be used. A data write-in apparatus in the distributed file system (hereinafter referred to as the apparatus) can select, in the replica servers managed by the metadata server, a replica server to write data into the replica server and can mark it as a target replica server. For example, a replica server with large remaining capacity can be selected.

In step 102, a write-in disk in the target replica server can be selected according to remaining capacity of disks managed by the target replica server and load of the disks.

In this step, after determining the target replica server, the apparatus further selects, in the target replica server, a disk for storing the write-in data and marks it as the write-in disk. The apparatus can determine the write-in disk based on the remaining capacity and the load. For example, the apparatus can score the remaining capacity and disk load of each disk, obtain the probability for the disk being selected in conjunction with the respective weight of the remaining capacity and the load, and then determine the write-in disk according to the probability.

In step 103, write-in data can be stored into the write-in disk through the target replica server.

After determining the write-in disk, the apparatus can store, through the target replica server, the data written by a client end on the write-in disk determined in the previous step.

Through a two-stage disk selection manner with a metadata server and a replica server, embodiments of the disclosure not only prevent the disk from being fully written but also avoid the production of hotspot access on the disk. When the load of each disk is basically the same, the disk with higher remaining capacity can be selected as the write-in disk, so as to prevent the disk from being fully written. When the remaining capacity is basically the same, the disk with lower disk load can be selected as the write-in disk, so as to avoid the production of hotspot access on the disk.

Figure 2:
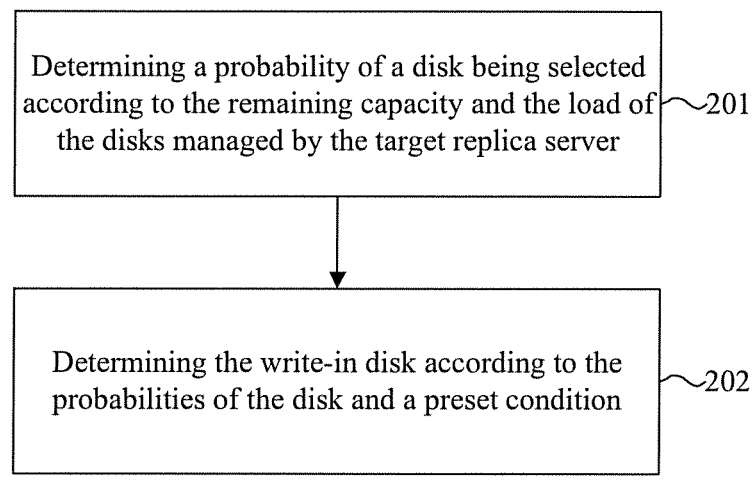
FIG. 2 is a flowchart of a method for selecting a write-in disk according to remaining capacity of disks managed by a target replica server and load of the disks, according to embodiments of the disclosure.

In some embodiments of the disclosure, as shown in FIG. 2, the process of selecting a write-in disk in the target replica server according to remaining capacity of disks managed by the target replica server and load of the disks can include steps 201 and 202.

In step 201, a probability for each disk being selected can be determined according to the remaining capacity of the disks managed by the target replica server and the load of the disks.

In this step, the remaining capacity of each disk managed by the target replica server and the load of each disk can be obtained, and then the probability for each disk to be selected can be determined according to the remaining capacity and the load. The method for determining the probability for each disk being selected can be performed by a variety of methods, one of which is described as below.

Figure 3:
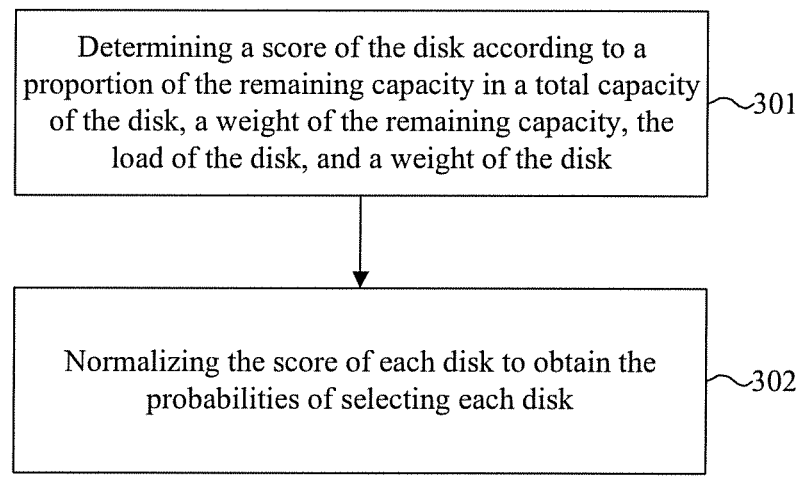
FIG. 3 is a flowchart of a method for determining a probability for each disk to be selected, according to embodiments of the disclosure.

Here, a method for determining the probability for each disk being selected can, as shown in FIG. 3, include: steps 301 and 303.

In step 301, a score of the disk can be determined according to a proportion of the remaining capacity to the total capacity of the disk and a weight of the remaining capacity, and the load of the disk and a weight of the load.

The same method can be used for determining the score of each disk in the target replica server. In some embodiments, the score of the proportion can be determined according to the proportion and the weight of the remaining capacity, and the score of the load can be determined according to the load and the weight of the load, and the score of the disk can be obtained by combining the two scores. For example, the score of the disk can also be obtained by combining the two scores using a function relation. In some embodiments, the score of the proportion and the score of the load can be determined, the score of the disk according to their respective weight can be then determined, and a function relation can also be introduced to determine the disk score.

For example, the load of the disk can be measured by the length of an IO queue of the disk, and a greater length of the IO queue of the disk can indicate a higher load of the disk.

In step 302, the score of each disk can be normalized to obtain the probability for each disk being selected.

After obtaining the score of each disk, the score can be normalized to obtain the probability for each disk being selected.

With reference back to FIG. 2, in step 202, the write-in disk can be determined according to the probability for each disk being selected and a preset condition.

After obtaining the probability for each disk being selected, the disk satisfying the preset condition can be determined as the write-in disk. For example, the preset condition can be autonomously set by a user.

Figure 4:
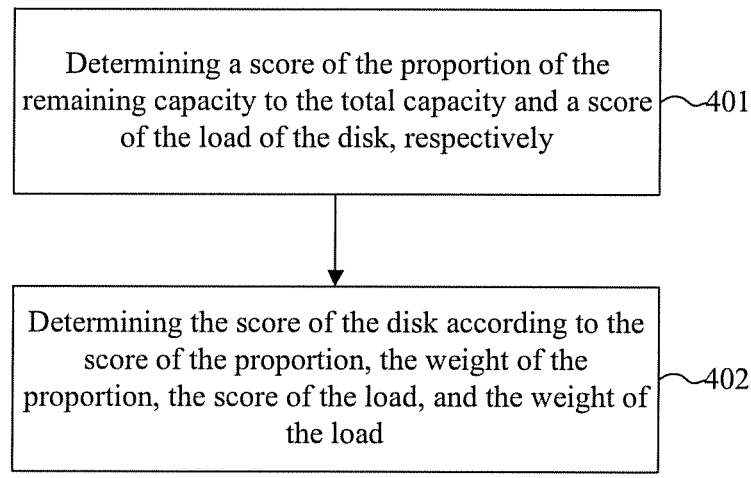
FIG. 4 is a flowchart of a method for determining a score of a disk, according to embodiments of the disclosure.

In some embodiments of the disclosure, a method for determining the disk score, as shown in FIG. 4, can include steps 401 and 402.

In step 401, determining a score of the proportion of the remaining capacity to the total capacity of the disk and a score of the load of the disk, respectively.

Here, the score of the proportion can have a monotone increasing function relation with the proportion, and the score of the load can also have a monotone increasing function relation with the proportion of the load. A definition domain of the monotone increasing function can be from minus infinity to positive infinity, a range of a codomain is from 0 to 1, the shape is of an S pattern. The monotone increasing function can be a classification evaluation model or a logic regression model and can belong to the category of multivariate analysis. For example, the monotone increasing function can be an "arctan" function.

In some embodiments, the target replica server contains N disks, and the proportion between the remaining capacity of each disk and the total capacity of the N disks is successively $R_1, R_2, \ldots,$ and $R_N$. The length of the current disk IO queue (which is associated with the disk load) of the N disks is successively $Q_1, Q_2, \ldots,$ and $Q_N$.

Then, the score $S_i(R_i)$ of the proportion of the remaining capacity to the total capacity of the disk and the score $S_i(Q_i)$ (i=1, N) of the load of the disk can be obtained through the following equation:

$$S_i(x_i) = \frac{1}{\pi}[\arctan(ax_i + b) + c] + \frac{1}{2}$$

$$a = \frac{6}{\text{high} - \text{low}}$$

$$b = \frac{-3(\text{high} - \text{low})}{\text{high} + \text{low}}$$

$$c = -\arctan(a \times \text{bottom} + b)$$

In the above equation, x can be R or Q, and the terms "high", "low" and "bottom" are empirical values. The value of $x_i$ can be between (low, high), and therefore $ax_i+b$ can be between (−3, 3), while "bottom" ensures that when $x_i$ is very low, $P_i=0$.

As the arctan function is a monotone increasing function, a relatively high score can indicate that the disk has a high proportion of remaining capacity or a low load, whereas a relatively low score can mean that the disk has a low proportion of remaining capacity or a high load.

In step 402, the score of the disk can be determined according to the score of the proportion and the weight of the proportion and the score of the load and the weight of the load.

After obtaining the score of the proportion of the remaining capacity to the total capacity of each disk and the score of the load of each disk, in this step, the score of each disk can be determined based on the weight of the remaining capacity of the disk and the weight of the disk load. For example, the score of each disk can be determined based on the equation below.

$$S_i = S_i(R_i)^w \times S_i(Q_i)^{1-w}$$

In the above equation, "w" is the weight corresponding to the remaining capacity of the disk, and "1-w" is the weight of the disk load, and the values of the weights can be empirical values.

After obtaining the score of each disk according to the above-mentioned steps 401-402, the foregoing step 302 can be performed to normalize the score of each disk and obtain the probability for each disk being selected.

The scores of the N disks can be normalized, and $S_i$ is used to indicate the score of the $i^{th}$ disk. A sum of the scores of the N disks can be 1. That is, $$\sum_{i=1}^{N} S_i = 1$$

Therefore, the probability $P_i$ for the $i^{th}$ disk can be determined according to the equation below:

$$P_i = \frac{S_i}{\frac{1}{N}\sum_{i=1}^{N} S_i}$$

Figure 5:
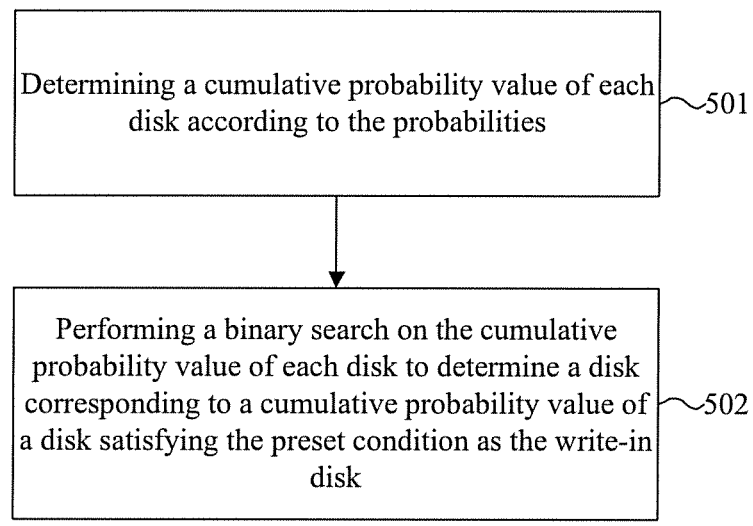
FIG. 5 is a flowchart of a method for determining a write-in disk according to the probability for each disk being selected and a preset condition, according to embodiments of the disclosure.

In some embodiments of the disclosure, the method for determining a write-in disk according to the probability for each disk being selected and a preset condition, as shown in FIG. 5, can include 501 and 502.

In step 501, a cumulative probability value of each disk can be determined according to the probability for each disk being selected.

For example, $P_i$ for the $i^{th}$ disk being selected can be determined according to the equation below.

$$P_i = \frac{S_i}{\frac{1}{N}\sum_{i=1}^{N} S_i}$$

The probabilities for all disks being selected can be added up to 1. For example, $P_1+P_2+P_3+ \ldots +P_N=1$ The cumulative probability value of each disk can be defined successively as $A_1, A_2, \ldots, A_N$, as below.

$$A_i = \sum_{j=1}^{i} P_j$$
$$i = 1, \ldots N$$

$A_i$ can be sorted in an ascending order, and the value range can be [0, 1], with $A_0=0$.

In step 502, a binary search can be performed on the cumulative probability value of each disk, and a disk corresponding to a cumulative probability value of a disk satisfying the preset condition can be determined as the write-in disk.

In some embodiments, a [0, 1] random number generator can be used to produce a random number r, and the preset condition can include disk i satisfying $A_{i-1} < r \leq A_i$.

If the apparatus performs the binary search on the sorted cumulative probability values of all disks and finds out that disk i satisfies $A_{i-1} < r \leq A_i$, then disk i can be determined as the write-in disk. The binary search can also be known as half-interval search, and its advantages can include fewer comparisons, a quicker search, and increased performance. The disk satisfying the preset condition can be quickly found in the sorted cumulative probability values by the binary search.

After the write-in disk is determined, the foregoing step 103 can be performed to store the write-in data.

It is appreciated that, method embodiments are expressed as combinations of a series of actions. However, embodiments of the disclosure are not limited by the sequence of the described actions. In addition, actions involved in the disclosure are not necessarily required.

Figure 6:
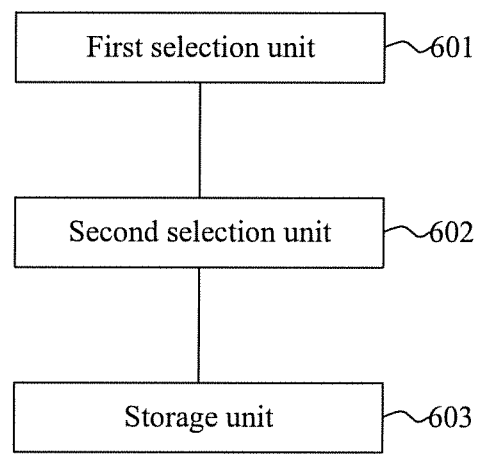
FIG. 6 illustrates a block diagram of a data write-in apparatus in a distributed file system, according to embodiments of the disclosure.

FIG. 6 illustrates a block diagram of a data write-in apparatus in a distributed file system, according to embodiments of the disclosure. The apparatus can include units 601-603.

A first selection unit 601 can be configured to select at least one target replica server from a plurality of replica servers managed by a metadata server according to remaining capacity of the plurality of replica servers.

A second selection unit 602 can be configured to select a write-in disk in the target replica server according to remaining capacity of disks managed by the target replica server and load of the disks.

A storage unit 603 can be configured to store write-in data into the write-in disk through the target replica server.

Embodiments of the disclosure determine a disk to store write-in data based on the remaining capacity of the disks and the load of the disks through the above-mentioned units. Embodiments of the disclosure not only prevent the disk from being fully written but also avoid the production of hotspot access on the disk. When the load of each disk is basically the same, it is possible to preferentially select the disk with higher remaining capacity as the write-in disk, thereby being able to prevent the disk from being fully written; and when the remaining capacity is basically the same, it is possible to preferentially select the disk with lower disk load as the write-in disk, thereby being able to avoid the production of hotspot access on the disk.

Figure 7:
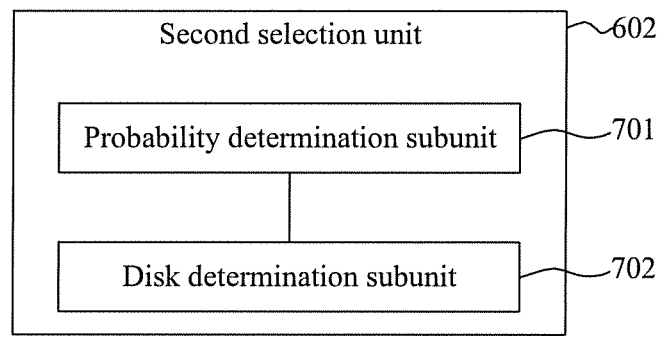
FIG. 7 illustrates a block diagram of a second selection unit, according to embodiments of the disclosure.

In some embodiments, as shown in FIG. 7, second selection unit 602 can further include: a probability determination subunit 701 and a disk determination subunit 702.

Probability determination subunit 701 can be configured to determine a probability for each disk being selected according to the remaining capacity and the load of the disks managed by the target replica server.

Disk determination subunit 702 can be configured to determine the write-in disk according to the probability for each disk being selected and a preset condition.

Figure 8:
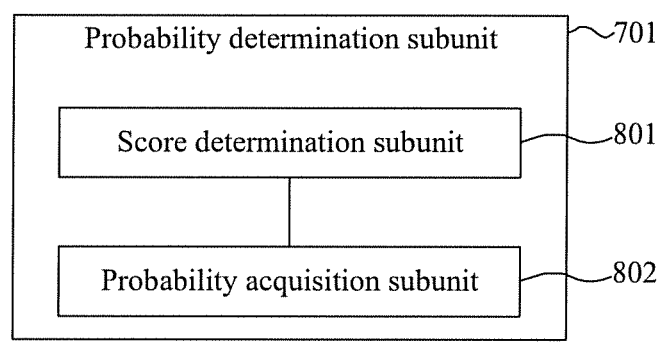
FIG. 8 illustrates a block diagram of a probability determination subunit, according to embodiments of the disclosure.

As shown in FIG. 8, probability determination subunit 701 can further include: a score determination subunit 801 and a probability acquisition subunit 802.

Score determination subunit 801 can be configured to determine a score of the disk according to a proportion between the remaining capacity and total capacity of the disk and a weight thereof and the load of the disk and a weight thereof.

Probability acquisition subunit 802 can be configured to normalize the score of each of the disks to obtain the probability for each of the disks being selected.

Figure 9:
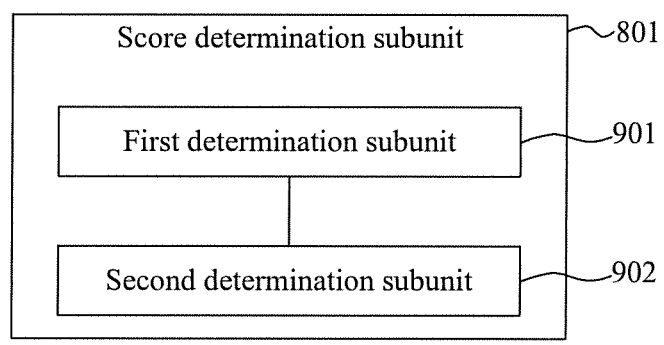
FIG. 9 illustrates a block diagram of a score determination subunit, according to embodiments of the disclosure.

As shown in FIG. 9, score determination subunit 801 can further include: a first determination subunit 901 and a second determination subunit 902.

First determination subunit 901 can be configured to determine a score of the proportion of the remaining capacity to the total capacity of the disk, and a score of the load of the disk respectively. The score of the proportion and the proportion can satisfy a monotone increasing function relation, and the score of the load and the load can also satisfy a monotone increasing function relation.

Second determination subunit 902 can be configured to determine the score of the disk according to the score of the proportion, the weight of the proportion, the score of the load, and the weight of the load.

The load of the disk can be the length of an IO queue of the disk.

Figure 10:
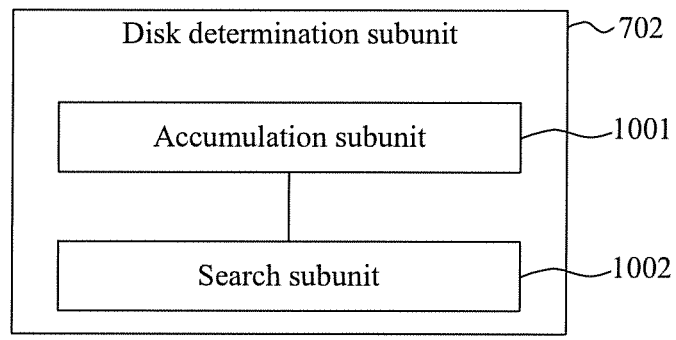
FIG. 10 illustrates a block diagram of a determination subunit, according to embodiments of the disclosure.

In some embodiments, as shown in FIG. 10, disk determination subunit 702 can further include: an accumulation subunit 1001 and a search subunit 1002.

Accumulation subunit 1001 can be configured to determine a cumulative probability value of each disk according to the probability for each disk being selected.

Search subunit 1002 can be configured to perform a binary search on the cumulative probability value of each disk to determine a disk corresponding to a cumulative probability value of a disk satisfying the preset condition as the write-in disk.

Embodiments of the disclosure further provide an electronic device that includes a memory and a processor.

The processor and the memory can be connected through a bus. The bus can be an Industry Standard Architecture (ISA) bus, a Peripheral Component Interconnect (PCI) bus, an Extended Industry Standard Architecture (EISA) bus, or the like. The bus can be classified into address bus, data bus, control bus, and the like.

The memory can be used to store a program. For example, the program can include program codes, and the program codes include computer operation instructions. The memory may contain a high speed RAM memory, and may also include a non-volatile memory, e.g., at least one disk memory.

The processor can be used to read program codes in the memory and cause the electronic device to perform: selecting at least one target replica server from a plurality of replica servers managed by a metadata server according to remaining capacity of the plurality of replica servers; selecting a write-in disk in the target replica server according to remaining capacity of disks managed by the target replica server and load of the disks; and storing write-in data into the write-in disk of the memory through the target replica server.

As the apparatus embodiment provides functionality that is basically similar to the functionality provided by the method embodiments, the description thereof is relatively simple. For relevant information, please refer to the part of explanation of the method embodiments.

Each of the embodiments in this disclosure is described in a progressive manner, each embodiment focuses on its difference from other embodiments, and identical or similar parts between the embodiments can be referred mutually.

It is appreciated that the embodiments of the disclosure can be provided as a method, an apparatus, or a computer program product. Therefore, embodiments of the disclosure can be in the form of a complete hardware embodiment, a complete software embodiment, or in the form of an embodiment combining software and hardware. Moreover, the embodiments of the disclosure can be in the form of a computer program product implemented on one or more computer usable storage media (including but not limited to disk memory, CD-ROM, optical memory, etc.) that contain computer usable program codes therein.

For example, the computer device can include one or more processors (CPUs), input/output interfaces, network interfaces and memories. The memory may include a non-permanent memory, a random access memory (RAM) and/or a non-volatile memory and other forms in the computer readable medium, such as a read-only memory (ROM) or a flash memory (flash RAM). The memory is an example of a computer readable medium. The computer readable medium includes permanent and non-permanent, movable and non-movable media that can realize information storage by any means or technology. The information can be a computer readable instruction, a data structure, a program module or other data. Examples of a computer storage medium include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disk read-only memory (CD-ROM), digital versatile disc (DVD) or other optical storage, magnetic tape cassette, magnetic tape magnetic disk storage or other magnetic storage devices or any other non-transmission media. The computer storage medium can be used to store information that can be accessed by computing devices. According to the definition in this disclosure, the computer readable medium does not include non-persistent computer readable media (transitory media), such as modulated data signals and carriers.

Embodiments of the disclosure are described in terms of the flowchart and/or block diagram of the method, terminal device (system), and computer program product of the embodiments of the disclosure. It is appreciated that each process and/or block in a flowchart and/or block diagram and the combination of processes and/or blocks in the flowchart and/or block diagram can be realized by computer program instructions. These computer program instructions can be provided to a computer, an embedded processor or a processor of other programmable data processing terminal devices to produce a machine, so as to enable the instructions executed by the computer or the processor of other programmable data processing terminal devices to produce an apparatus for realizing a function specified in one or more processes of a flowchart and/or one or more blocks of a block diagram.

These computer program instructions can also be stored in a computer readable memory that can guide a computer or other programmable data processing terminal devices to work in a particular way, so as to enable the instructions stored in the computer readable memory to produce a manufactured article that includes an instruction apparatus. The instruction apparatus realizes a function specified in one or more processes of a flowchart and/or one or more blocks of a block diagram.

These computer program instructions can also be loaded into a computer or other programmable data processing terminal devices, to enable the computer or other programmable terminal devices to perform a series of operation steps to produce the processing realized by the computer, thereby providing a step for realizing a function specified in one or more processes of a flowchart and/or one or more blocks of a block diagram through the instructions executed on the computer or other programmable terminal devices.

Although embodiments of the disclosure have been described, it is appreciated that other changes and modifications can be made to these embodiments in view of the basic inventive concept. Therefore, the appended claims are intended to be construed as including all changes and modifications that fall into the scope of embodiments of the disclosure.

Further, relation terms such as the first and the second are merely used for differentiating one entity or operation from another entity or operation, and do not necessarily require or imply any of these practical relations or sequences between these entities or operations. Moreover, the term "comprise," "include," or any other variants thereof is intended to cover a non-exclusive inclusion, which makes a process, method, item or terminal device including a series of elements not only include those elements, but also include other elements that are not explicitly listed, or also include the elements inherent to the process, method, item or terminal device. In the absence of more restrictions, the element defined by the statement "include a" does not rule out other identical elements in the process, method, item or terminal device that includes the elements.

Above is a detailed introduction to the data write-in method in a distributed file system and the data write-in apparatus in a distributed file system provided in the disclosure. Specific examples are used in this specification to elaborate on the theory and implementation of the disclosure, and the explanation of the above embodiments is just used to help understand the method of the disclosure and the core concept thereof. Meanwhile, for a person of ordinary skill in the art, there will be changes to the specific implementation and the range of applications according to the concept of the disclosure. In summary, the content of this specification should not be understood as a restriction to the disclosure.

What is claimed is:

1. A data write-in method, comprising:
   selecting at least one target replica server from a plurality of replica servers managed by a metadata server according to remaining capacity of the plurality of replica servers;
   selecting a write-in disk among a plurality of disks in the selected target replica server according to remaining capacity and load of each of the plurality of disks managed by the target replica server, wherein selecting the write-in disk among the plurality of disks in the target replica server further comprises:
      determining a probability of a disk among the plurality of disks being selected according to the remaining capacity and the load of each of the plurality of disks managed by the target replica server; and
      determining the write-in disk according to the probabilities of the plurality of disks; and
   storing write-in data into the write-in disk through the target replica server.

2. The method according to claim 1, wherein determining the probability of the disk among the plurality of disks being selected further comprises:
   determining a score of each of the plurality of disks according to a proportion of the remaining capacity to a total capacity of each of the plurality of disks, a weight of the remaining capacity of each of the plurality of disks, the load of each of the plurality of disks, and a weight of the load of each of the plurality of disks; and
   normalizing the score of each of the plurality of disks to obtain the probability of each of the plurality of disks being selected.

3. The method according to claim 2, wherein determining the score of each of the plurality of disks further comprises:
   determining a score of the proportion of the remaining capacity to the total capacity of each of the plurality of disks, and a score of the load of each of the plurality of disks, wherein the relationship between the score of the proportion and the proportion is expressed as a first monotonically increasing function, and the relationship between the score of the load and the load is expressed as a second monotonically increasing function; and
   determining the score of each of the plurality of disks according to the score of the proportion, the weight of the proportion, the score of the load, and the weight of the load for each of the plurality of disks.

4. The method according to claim 2, wherein the load of each of the plurality of disks is associated with a length of an input-output (IO) queue of each of the plurality of disks.

5. The method according to claim 1, wherein determining the write-in disk according to the probabilities of the plurality of disks comprises:
   determining a cumulative probability value of each of the plurality of disks according to the probabilities; and
   performing a binary search on the cumulative probability values of the plurality of disks to determine a disk whose cumulative probability value satisfying a preset condition as the write-in disk,
   wherein the preset condition includes disk i satisfying $A_{i-1} < r \leq A_i$, r being a random number, i being a natural number, and $A_i$ being a cumulative probability of disk i.

6. A data write-in apparatus, comprising:
   a first selection unit configured to select at least one target replica server from a plurality of replica servers managed by a metadata server according to remaining capacity of the plurality of replica servers;
   a second selection unit configured to select a write-in disk among a plurality of disks in the selected target replica server according to remaining capacity and load of each of the plurality of disks managed by the target replica server, wherein the second selection unit further comprises:
      a probability determination subunit configured to determine a probability of a disk among the plurality of disks being selected according to the remaining capacity and the load of each of the plurality of disks managed by the target replica server; and
      a disk determination subunit configured to determine the write-in disk according to the probabilities of the plurality of disks; and
   a storage unit configured to store write-in data into the write-in disk through the target replica server.

7. The apparatus according to claim 6, wherein the probability determination subunit further comprises:
   a score determination subunit configured to determining a score of each of the plurality of disks according to a proportion of the remaining capacity to a total capacity of each of the plurality of disks, a weight of the remaining capacity of each of the plurality of disks, the load of each of the plurality of disks, and a weight of the load of each of the plurality of disks; and a probability acquisition subunit configured to normalize the score of each of the plurality of disks to obtain the probability of each of the plurality of disks being selected.

8. The apparatus according to claim 7, wherein the score determination subunit further comprises:
a first determination subunit configured to determine a score of the proportion of the remaining capacity to the total capacity and a score of the load of each of the plurality of disks, wherein the relationship between the score of the proportion and the proportion is expressed as a first monotonically increasing function and the relationship between the score of the load and the load is expressed as a second monotonically increasing function; and
a second determination subunit configured to determine the score of the disk according to the score of the proportion, the weight of the proportion, the score of the load, and the weight of the load for each of the plurality of disks.

9. The apparatus according to claim 6, wherein the load of each of the plurality of disks is associated with a length of an input-output (IO) queue of each of the plurality of disks.

10. The apparatus according to claim 6, wherein the disk determination subunit comprises:
an accumulation subunit configured to determine a cumulative probability value of each disk according to the probabilities; and
a search subunit configured to perform a binary search on the cumulative probability values of the plurality of disks to determine a disk whose cumulative probability value satisfying a preset condition as the write-in disk, wherein the preset condition includes disk i satisfying $A_{i-1} < r \leq A_i$, r being a random number, i being a natural number, and $A_i$ being a cumulative probability of disk i.

11. A non-transitory computer readable medium storing a set of instructions that are executable by at least one processor of a computing system to cause the computing system to perform a data write-in method, the method comprising:
selecting at least one target replica server from a plurality of replica servers managed by a metadata server according to remaining capacity of the plurality of replica servers;
selecting a write-in disk among a plurality of disks in the selected target replica server according to remaining capacity and load of each of the plurality of disks managed by the target replica server, wherein selecting the write-in disk among the plurality of disks in the selected target replica server further comprises:
determining a probability of a disk among the plurality of disks being selected according to the remaining capacity and the load of each of the plurality of disks managed by the target replica server; and
determining the write-in disk according to the probabilities of the plurality of disks; and
storing write-in data into the write-in disk through the target replica server.

12. The non-transitory computer readable medium according to claim 11, wherein determining the probability of the disk among the plurality of disks being selected comprises:
determining a score of each of the plurality of disks according to a proportion of the remaining capacity to a total capacity of each of the plurality of disks, a weight of the remaining capacity of each of the plurality of disks, the load of each of the plurality of disks, and a weight of the load of each of the plurality of disks; and
normalizing the score of each of the plurality of disks to obtain the probability of each of the plurality of disks being selected.

13. The non-transitory computer readable medium according to claim 12, wherein determining the score of each of the plurality of disks comprises:
determining a score of the proportion of the remaining capacity to the total capacity of each of the plurality of disks, and a score of the load of each of the plurality of disks, wherein the relationship between the score of the proportion and the proportion is expressed as a first monotonically increasing function, and the relationship between the score of the load and the load is expressed as a first monotonically increasing function; and
determining the score of the disk according to the score of the proportion, the weight of the proportion, the score of the load, and the weight of the load for each of the plurality of disks.

14. The non-transitory computer readable medium according to claim 12, wherein the load of each of the plurality of disks is associated with a length of an input-output (IO) queue of each of the plurality of disks.

15. The non-transitory computer readable medium according to claim 11, wherein determining the write-in disk according to the probabilities of each disk includes:
determining a cumulative probability value of each of the plurality of disks according to the probabilities; and
performing a binary search on the cumulative probability values of the plurality of disks to determine a disk whose cumulative probability value satisfying a preset condition as the write-in disk,
wherein the preset condition includes disk i satisfying $A_{i-1} < r \leq A_i$, r being a random number, i being a natural number, and $A_i$ being a cumulative probability of disk i.

16. The method according to claim 3, wherein the first monotonically increasing function and the second monotonically increasing function are the same function or different functions.

17. The method according to claim 1, wherein
when the plurality of disks have the same load, one of the plurality of disks with a highest remaining capacity is selected as the write-in disk, and
when the plurality of disks have the same remaining capacity, one of the plurality of disks with lowest load is selected as the write-in disk.

* * * * *